May 10, 1932.  R. J. REANEY  1,857,871
MECHANICAL MOVEMENT
Filed May 17, 1927   3 Sheets-Sheet 1
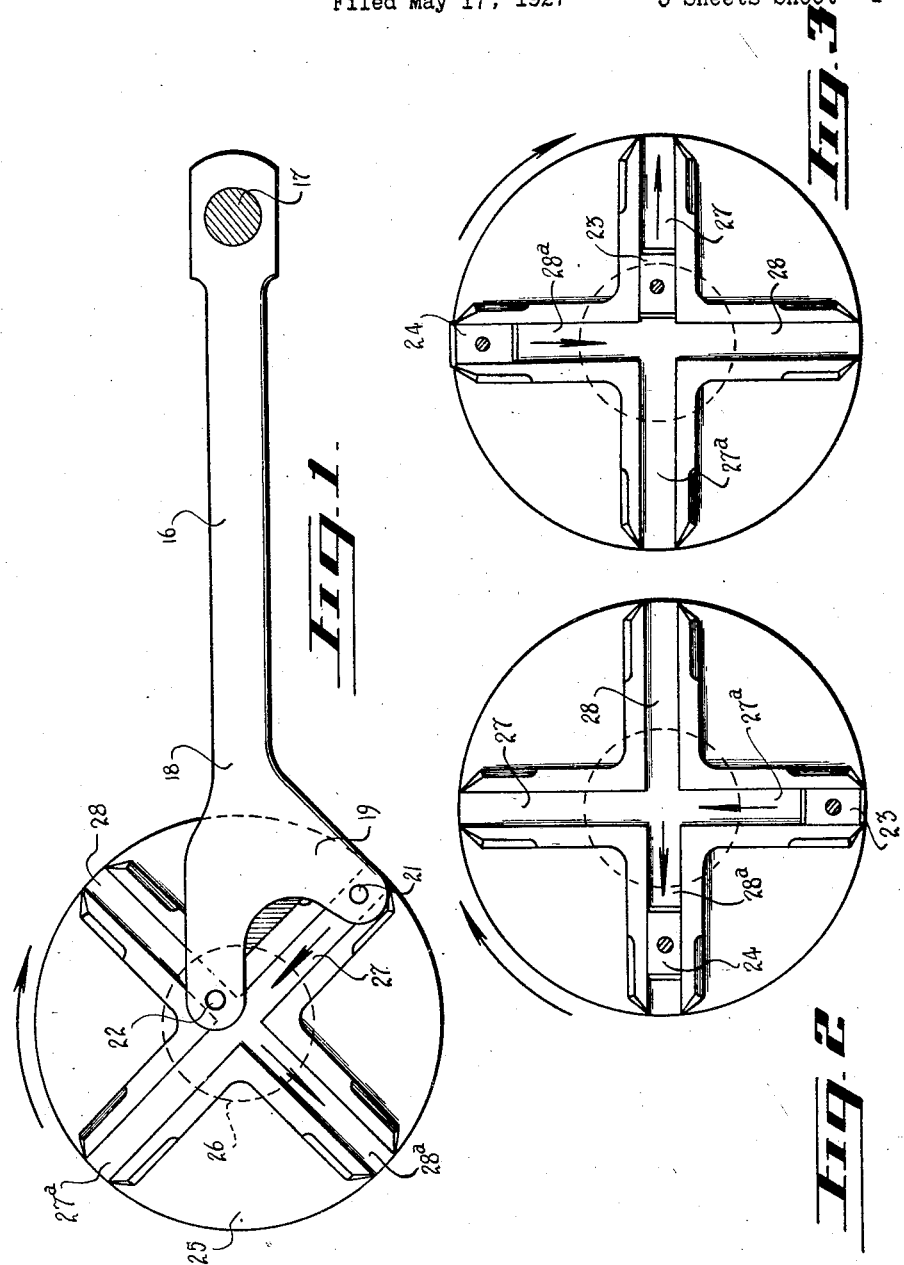
INVENTOR
RUSSELL J. REANEY.
BY Harold D. Penney
HIS ATTORNEY.

May 10, 1932. R. J. REANEY 1,857,871
MECHANICAL MOVEMENT
Filed May 17, 1927    3 Sheets-Sheet 2
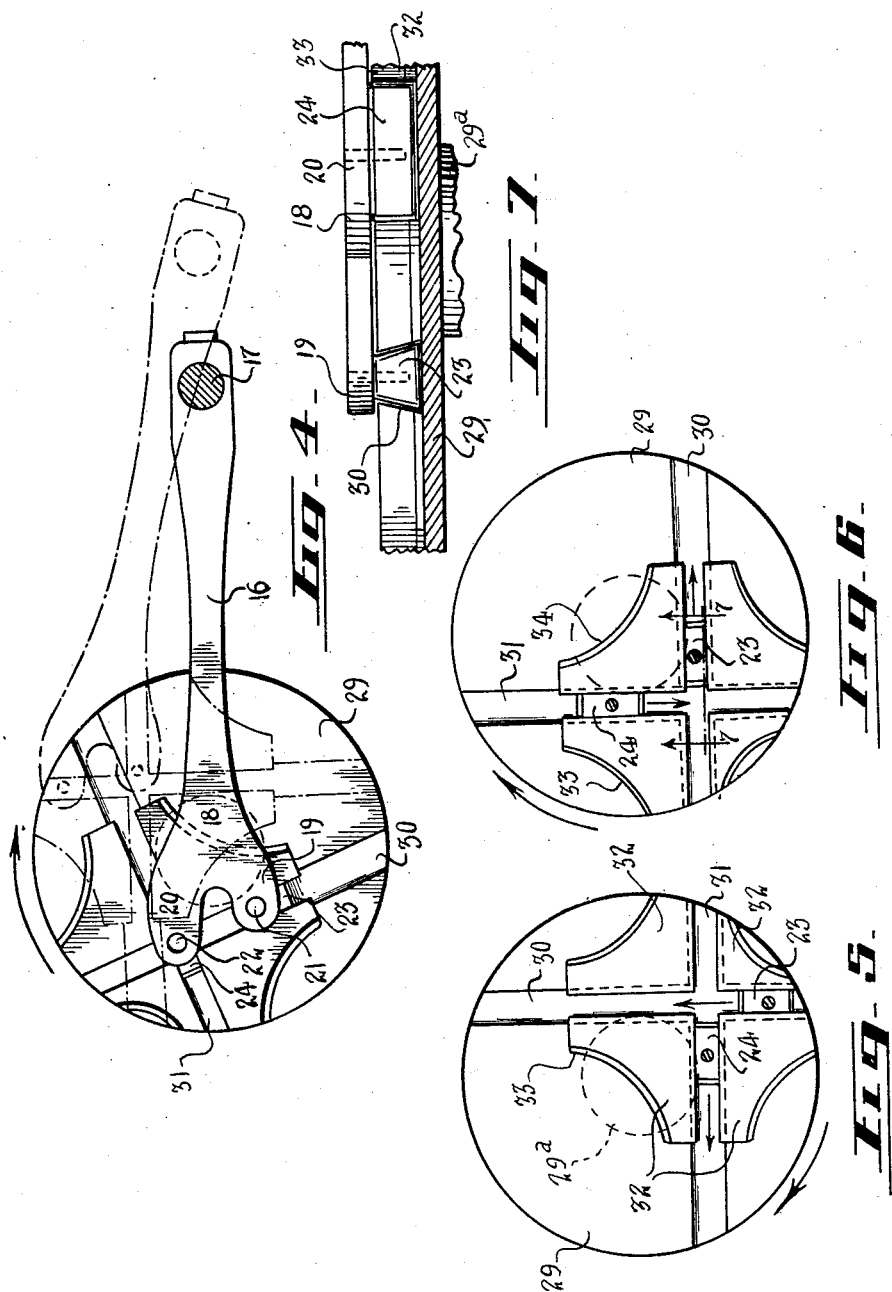
INVENTOR
RUSSELL J. REANEY
BY Harold D. Penney
HIS ATTORNEY

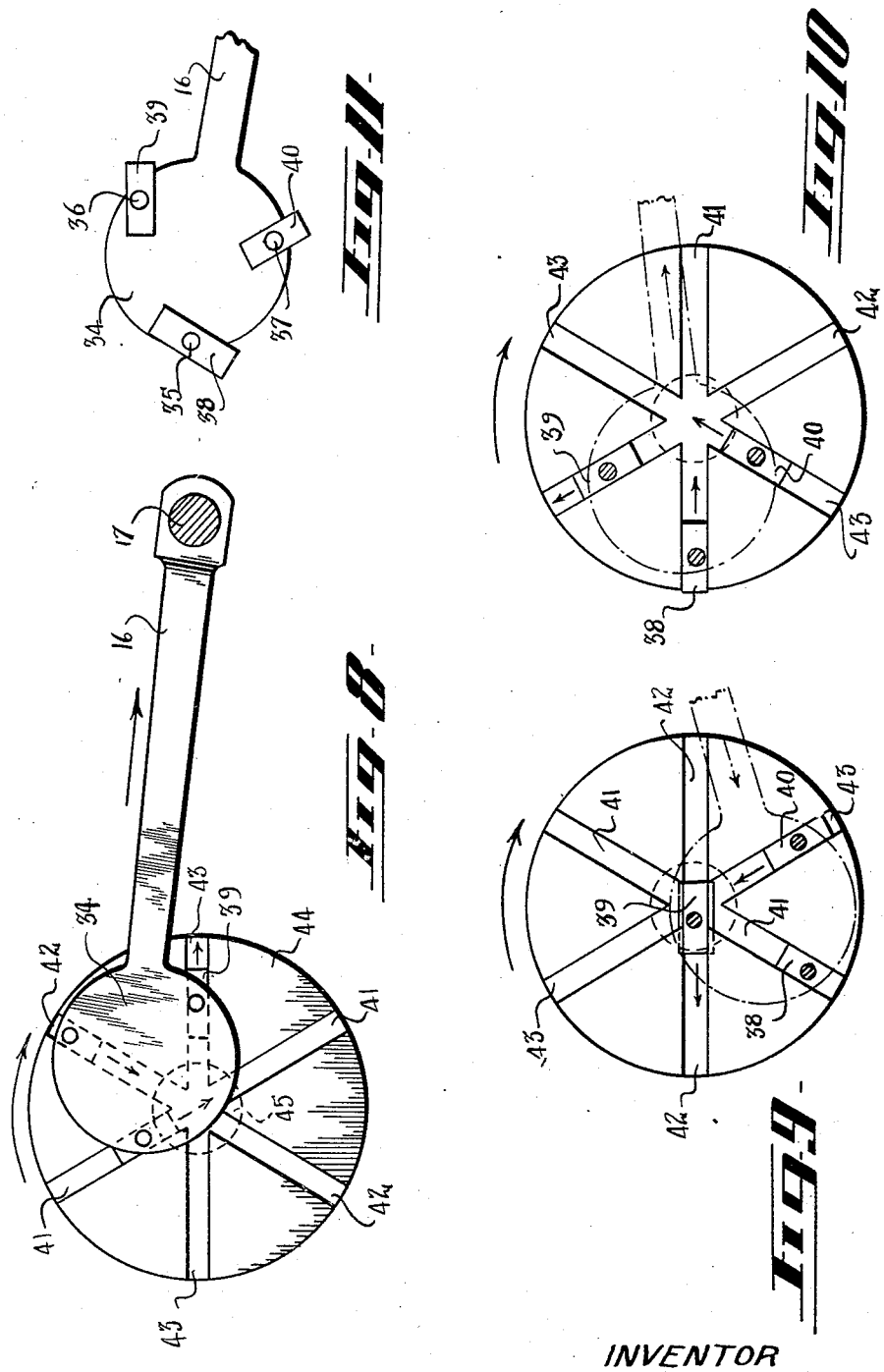

Patented May 10, 1932

1,857,871

UNITED STATES PATENT OFFICE

RUSSELL J. REANEY, OF OTTAWA, ONTARIO, CANADA

MECHANICAL MOVEMENT

Application filed May 17, 1927. Serial No. 192,021.

This present invention relates to certain new and useful improvements in a mechanical movement and has particular reference to a mechanical movement for transverting a reciprocating movement into a rotary movement with the minimum expenditure of energy and the maximum efficiency.

The invention has for another object the provision of mechanical movement of the character stated in which the operative parts are constructed and arranged in such a manner as to reduce to the minimum liability of locking at dead center and permit easy operation of the mechanical movement with an effective pulling and pushing operation at all times by the reciprocating driving member of the rotatable driven member, thus obtaining the full benefit of all of the driving energy.

A further object of the invention resides in the provision of a mechanical movement of the character stated in which all of the driving or pushing and pulling operations occur concentrically of the mounting of the rotatable member as the driving or pushing or pulling blocks are concentrically of the rotatable member and at the same time slide transversely thereof in crossed or intersecting guide slots of the rotatable member.

A further object of the invention resides in the provision of a mechanical movement of the character stated which is an improvement over similar mechanical movements of the class sometimes termed trammel gearing and which is particularly adapted for use as a driving connection for locomotives, stationary engines, farming machinery and in fact any and all engines, motors or machinery where a mechanical movement may be employed to convert a reciprocating motion into a rotary motion or vice versa.

A further object of the invention resides in the provision of a mechanical movement of the character stated in which are employed a plurality of blocks pivoted on an extension or an enlarged head of a reciprocating member with each of the blocks out of alignment with the centre of the driving force.

A still further object of the invention resides in the provision of a mechanical movement of the character stated in which the proper and efficient operation will be assured at all times due to the driving blocks being dove-tailed and sliding freely in correspondingly dove-tailed guide grooves, the blocks being preferably carried by the reciprocating member and the guide grooves provided in the rotatable member.

To the accomplishment of these and related objects as will become apparent as the description proceeds, my invention resides in the construction, combination and arrangement of parts as shall be hereinafter more fully described, illustrated in the accompanying drawings and pointed out in the claims hereunto appended.

The invention will be best understood and can be more clearly described when reference is had to the accompanying drawings forming a part of this disclosure, wherein like characters indicate like parts throughout the several views.

In the drawings:—

Figure 1 is a side elevation of the form of the mechanical movement;

Figure 2 is a side elevation of the rotatable member, the blocks being shown in their operative position in the grooves after rotation of the rotatable member in one direction from the position shown in Figure 1;

Figure 3 is a view similar to that of Figure 2, with the blocks shown in the position they will occupy after a quarter turn of the rotatable member in one direction from the position shown in Figure 2;

Figure 4 is a view similar to Figure 1 showing a modified form of the invention;

Figure 5 is a side elevation of the rotatable member shown in Figure 4, the driving blocks being shown in operative position after a quarter turn of the rotatable member from the position indicated by the dotted lines in Figure 4;

Figure 6 is a view similar to Figure 5 showing the position of the rotatable member and the blocks after a quarter turn of the rotatable member in one direction from the position shown in Figure 5;

Figure 7 is an enlarged detailed section taken substantially on the plane of line 7—7 of Figure 6, looking in the direction indicated by the arrows.

Figure 8 is a view similar to Figures 1 and 4 showing a further modified form of the invention.

Figure 9 is a side elevation of the rotatable member with the driving blocks shown in the operative position they occupy when the rotatable member is given a one-sixth rotation in one direction from the position shown in Figure 8;

Figure 10 is a view similar to that of Figure 9 showing the position of the driving blocks when the rotatable member is given a one-sixth turn from the position shown in Figure 9; and Figure 11 is a side elevation of the reciprocating driving member, showing the mounting of the driving block on the inner face thereof, a portion of the shaft of the driving member being broken away.

Referring more in detail to the drawings it is to be noted that the mechanical movement includes a reciprocating member 16 in the form of a pitman arm which may be connected with the primary driving member (not shown), through the connecting pin 17 and extended transversely through the outer end of the driving member 16, as will be readily understood by parties familiar with this art. The driving member 16 has an enlarged forward end 18 which terminates in diverging fingers 19 and 20, the finger 19 being directed downwardly and is somewhat shorter than the other finger 20. The latter is extended forwardly parallel with the shank of the driving member 16 but slightly offset therefrom. The pins 21 and 22 are extended laterally through the ends of the fingers 19 and 20 respectively and have mounted thereon the dove-tailed operating blocks 23 and 24 of rectangular or oblong formation as shown clearly in Figures 2 and 3.

The rotatable driven member 25 is carried on the shaft 26 shown by dotted lines in the drawings. In one face of the rotatable driven member 25 a pair of crossed and intersecting guide grooves 27 and 28 are provided and arranged at right angles to one another with their crossed or intersecting portions at the centre of the rotatable driven member 25. The block 23 operates back and forth in the groove 27 while the block 24 has a similar movement in the groove 28, as indicated by the different positions of the blocks 23 and 24 and the grooves 27 and 28 in Figures 1, 2 and 3, of the drawings. In the position shown in Figure 1, the block 23 is at the outer end of the groove 27 while the block 24 is at the inner end of the groove 28, when the shank of the reciprocating driving member 16 is in a horizontal plane and at the inner end or beginning of its stroke. A one-eighth turn of the rotatable driven member 25 will begin with the beginning of the forward stroke of the reciprocating driving member 16, the blocks and grooves will be brought to the position shown in Figure 2, in which block 24 has crossed in groove 27 and moved to a position near the outer end of the opposite section 28A of the groove 28, the grooves 28 at this time being in a horizontal position while the groove 27 is in a vertical plane. The next one-quarter turn of the rotatable driven member 25 results in bringing the groove 27 into a horizontal plane with the block 23 at the inner end of the main section of the groove 27 and the groove 28 in a vertical plane with the block 24 at the extreme outer end of the section 28A thereof. Continued rotation of the rotatable driven member 25 by reciprocation of the reciprocated driving member 16 will result in constant changing of positions of the blocks 23 and 24 in their respective grooves 27 and 28 and movement of the blocks 23 and 24 across the centre of the rotatable driven member 25 as they change from one section to the other of their respective grooves 27 and 28. It will be evident that the blocks 23 and 24 work constantly against the walls of their respective grooves 27 and 28 to drive or rotate the rotatable driven member 25 by pushing and pulling on the walls of said grooves 27 and 28 during both the forward and return strokes of the reciprocating driving member 16. Furthermore, owing to the relative positions of the blocks 23 and 24 with respect to the longitudinal axis of the driving forces and the arrangement of the grooves 27 and 28 on the rotatable driven member 25, liability of locking at dead center is reduced to the minimum and the maximum power and efficiency is obtained with the minimum expenditure of driving energy.

In the form of the invention shown in the Figures 4 to 7 inclusive, the shape and arrangement of the fingers 19 and 20 at the forward end of the shank 16 of the reciprocating driving member is varied slightly but the pins 21 and 22 are extended through the ends thereof in a similar manner to support the blocks 23 and 24 out of alignment with the longitudinal axis of the driving force and also distinctly out of alignment with the longitudinal axis of the shank of the reciprocating driving member 16. In this form of the invention, however, the rotatable driven member 29 has the crossed grooves 30 and 31 arranged in a different position with respect to the centre of the member 29.

The grooves 30 and 31 are at right angles but are both offset from the centre of the rotatable driven member 29 and intersect one another at the crossed end portion of said grooves 30 and 31. The grooves 30 and 31 may be of dovetail form, as shown clearly in Figure 7, and the depth thereof may be increased at the crossed portions in which the blocks 23 and 24 operate by triangular plates 32 arranged thereon and having portions depending in the grooves 30 and 31. The plates 32 are also shown as being provided with shallow arcuate upstanding flanges 33 on either outer edges to space the head 18 of the reciprocating driving member 16 from the face of the rotary driven member 29 and prevent the same from striking and catching on the plates 32 during the operation of the mechanical movement. When the rotatable driven member 29 is rotated a little more than a one-quarter turn from the position indicated by dotted lines in Figure 4 to the position shown in Figure 5, the blocks 23 and 24 will slide to the positions indicated in the grooves 30 and 31, respectively. Another one-quarter turn of the rotatable driven member 29 in the same direction will result in moving the blocks 23 and 24 to different positions in the grooves 30 and 31, respectively, as shown clearly in Figure 6. It will be seen from this view that during this second one-quarter turn of the rotatable driven member 29, the block 23 slides from the shorter section of the groove 30 across the groove 31 and moves into the main or long section of the groove 30. At the same time, the block 24 moves away from the groove 30 and back for some distance in the main or long section of the groove 31. During continued rotation of the rotatable driven member 29, the blocks 23 and 24 are moved back and forth in their respective grooves 30 and 31 with the blocks bearing against the walls of the grooves 30 and 31 to exert both shoving and pulling pressure against the walls of the grooves 30 and 31, and thus compel rotation of the rotatable driven member as long as the reciprocating driving member 16 is operating. Liability of locking of the device at dead centre is reduced to the minimum, due to the arrangement and action of the blocks 23 and 24 with relation to the longitudinal axis of the driving force. It is to be understood that the rotatable driven member 29 is carried on a suitable shaft 29A, as shown by dotted lines in Figures 4 to 6 inclusive, and by full lines in Figure 7.

In Figures 8, 9, 10 and 11, a further modified form of the invention is illustrated and which includes an enlarged head 34 of circular outline on the forward or driving end of the shank of the reciprocating driving member 16. The shape of the head 34 may be changed to triangular or otherwise varied, as desired, but is designed to have outlined thereon a triangle by three block carrying pins 35, 36 and 37, extended laterally therethrough at such points that the outlined triangle is tilted with respect to the longitudinal axis of the reciprocating driving member 16, as well as the longitudinal axis of the driving force, thus throwing off centre each of the block supporting pins 35, 36 and 37. Pivoted on the pins 35, 36 and 37, respectively, are the driving blocks 38, 39 and 40 which are preferably beveled or dove-tailed as in the other forms and work in grooves in a rotatable driven member 41, as will now be stated. One face of the rotatable driven member 41 has provided therein three equally spaced radial grooves 41, 42 and 43 which intersect and cross one another at the centre of the rotatable driven member 44 carried on the shaft 45. It is to be understood that the driving blocks 38, 39 and 40 are of sufficient length to assure them of being held in proper position while crossing over the centre of the rotatable driven member 44 from one section to the other section of their respective grooves 41, 42 and 43.

When the rotatable driven member 44 has been given a one-sixth rotation on the grooves 41, 42 and 43 with the operating blocks 38, 39 and 40 working therein, it will be changed from the position shown in Figure 8 to the position shown in Figure 9. It will be seen that at this time the operating block 39 is moving through the centre of the groove 42 and crossing the grooves 41 and 43 to pass into the other section of the groove 42 from the section in which it is operating in Figure 8. At the same time the operating blocks 38 and 40 are occupying positions in the outer portions of the slots 41 and 43 respectively. This means that the block 38 has crossed the grooves 42 and 43 and moved into the section of the groove 41 opposite that which it occupies in Figure 8. Then as another one-sixth turn or rotation is given to the rotatable driven member 44, the grooves 41, 42 and 43 and the blocks 38, 39 and 40 respectively operating therein move to the positions shown in Figure 10, with the block 40 approaching the centre of the rotatable operating member 44 to cross the grooves 41 and 42 and to pass into opposite sections of the grooves 43 during the next or third part of the rotation of the rotatable member 44. As rotation of the operating member 44 is continued in this direction the operating blocks 38, 39 and 40 continue to pass back and forth in their operative grooves 41, 42 and 43 and it would be seen that at all times all of the operating blocks 38, 39 and 40 are offset from the longitudinal axis of the driving force, thereby effectively reducing to the minimum liability of the device locking at dead center. Furthermore, as each block is changing from movement in one direction to movement in the reverse direction and therefore not driving but either pulling or pushing on the walls of the groove in which it operates, the other two blocks are pulling and pushing effectively on the walls of their respective grooves and a great portion of the time all three blocks are effectively operating to drive or rotate the rotatable driven member 44 during reciprocation of the reciprocating driving member 16.

As the construction of the device has thus been described in detail, brief reference is now had to its use and modus operandi. The mechanical movement may be used as a driving connection on a locomotive, stationary engine, boat engine, tractors or other farm machinery where power is to be transmitted from reciprocating motion to rotary motion or vice versa. It is also apparent that the operation may be reversed in any one of the forms of the invention and the rotatable member employed as the operating member while the reciprocating member is the driven or operating member of the mechanical movement. The driving between the reciprocating member and the rotatable member is accomplished in either case by operation of the driving blocks on the walls of the grooves in which they operate.

From the foregoing description taken in connection with the accompanying drawings, it will be manifest that a mechanical movement is provided that will fulfil all the necessary requirements of such a device, but as many changes could be made in the above description and many apparently widely different embodiments of my invention constructed within the scope of the appended claims without departing from the spirit or scope thereof it is intended that all matters contained in the said accompanying specification and drawings shall be interpreted as illustrative and not in a limited sense.

Having thus described my invention, what I claim as new and desire to secure by Letters Patent is:—

1. A mechanical movement including a rotatable member and a reciprocating member; one of said members having a pair of straight symmetrically arranged grooves at right angles to one another in one face and offset from the centre of said member with the grooves intersecting and crossing near their outer ends at a point eccentric to the centre of said member and near the outer edge of said member; and a corresponding number of blocks pivotally mounted on diverging extensions of said other member at points offset from one another and also offset from the longitudinal axis of the driving force and to opposite sides thereof; said blocks being arranged for operation in said grooves in such a manner that not more than one of said blocks is at any time failing to exert either a pushing or pulling pressure on the walls of its respective groove during operation of the mechanical movement, thus reducing to the minimum liability of locking at dead center; said grooves and said blocks being constructed so as to prevent either of said blocks from pulling laterally out of their respective grooves as they reciprocate therein across the grooved member.

2. A mechanical movement including a rotatable member and a reciprocating member; said rotatable member having a pair of straight symmetrically arranged grooves in one face and crossing and intersecting one another at right angles adjacent one end of said grooves and near the periphery of said rotatable member, at a point eccentric to the centre of said rotatable member; said reciprocating member having diverging extensions at one end; blocks pivotally mounted on said diverging extensions at points offset from one another and also offset from the longitudinal axis of the driving force of said reciprocating member and to opposite sides of said driving force; said blocks being arranged for operation in said grooves in such a manner that only one of said blocks is at any time failing to exert either a pushing or pulling pressure on the walls of its perspective groove during operation of the mechanical movement, thus reducing to the minimum liability of locking at dead center; said blocks and grooves being formed to prevent either of said blocks from pulling laterally out of its perspective groove as it reciprocates therein across the rotatable member.

3. A mechanical movement including a rotatable member and a reciprocating member; said rotatable member having a pair of straight grooves arranged in one face at right angles to one another and crossing and intersecting at a point near their outer ends and adjacent the periphery of said rotatable member; said reciprocating member having diverging extensions; and blocks pivotally mounted on said diverging extensions and operating in the respective grooves in the said rotatable member in such a manner that not more than one of said blocks is at any time failing to exert either a pushing or pulling pressure on the walls of its respective groove during operation of the mechanical movement, thus reducing to the minimum liability of locking at dead centre.

In testimony whereof I hereunto affix my signature.

RUSSELL J. REANEY. [L. S.]